INVENTOR.
Julio H. Campo

United States Patent Office 3,338,547
Patented Aug. 29, 1967

3,338,547
AUTOMATIC CONTROLLER FOR FLUID SYSTEMS
Julio H. Campo, Canoga Park, Calif., assignor to North American Aviation, Inc.
Filed Mar. 29, 1965, Ser. No. 443,285
9 Claims. (Cl. 251—118)

ABSTRACT OF THE DISCLOSURE

An automatic controller that receives input signals from a fluid system and selectively responds to those input signals having a rate of increase greater than a predetermined rate, and develops a corresponding output signal that can be used as a control signal to the fluid system.

---

The present invention relates to an automatic controller, and more particularly to a pressure controller for detection and compensation of disturbances in a fluid system.

In a fluid system such as a steam generating system, the automatic detection and compensation for system pressure disturbances within a relatively short period of time is highly desirable. For example, prompt detection of a tube failure in a heat exchanger or boiler of the system is necessary so that the failed heat exchanger loop can be immediately isolated from the system. Likewise, the prompt detection and automatic correction for steep pressure ramps or surges in a fluid system can prevent damage to the system. Conventional pressure responsive regulators and safety valves, which operate on pressure level, will compensate for a pressure buildup in the system; however, the time lag in their response characteristics subjects the entire fluid system to unnecessary and unwanted stresses before reducing the system pressure to a safe level.

Accordingly, it is an object of the present invention to provide a new and improved automatic controller suitable particularly for fluid systems.

An additional object is to provide an automatic controller which has rapid response characteristics to system pressure disturbances.

Another object is to provide an automatic controller which is adjustable and has a high degree of reliability.

It is also an object to provide an automatic controller suitable for high temperature and high pressure hydraulic systems.

In accordance with the invention, a new and improved automatic controller is provided wherein an input pressure signal from a fluid system produces an actuating force on an obverse face of a sensing piston. A balancing force for the input pressure signal is obtained in the controller by lagging part of the input pressure through an adjustable restricter means to a balance chamber which acts upon the reverse face of the sensing piston. A capacitance is introduced by a spring-loaded buffer piston which cooperates with, but is spaced from, the sensing piston. At flat input pressure signals, the balance chamber pressure essentially follows the slow input pressure and little movement of the sensing piston will occur. At steep input pressure signals or ramps, the sensing piston is sharply displaced under the actuating force of the rapid input pressure signal because the balancing portion of the input signal lags behind as it bleeds past the adjustable restricter means into the balance chamber. The balance chamber pressure will slowly increase as more and more of the input signal bleeds past the restricter means to balance the input pressure and restore the sensing piston to its neutral position. A suitable signal means that cooperates with the sensing piston develops an output control signal responsive to the sharp displacement of the sensing piston.

Further objects, features, and the attending advantages of the invention will be apparent with regard to the following description when read with the accompanying drawing, in which.

Figure 1:
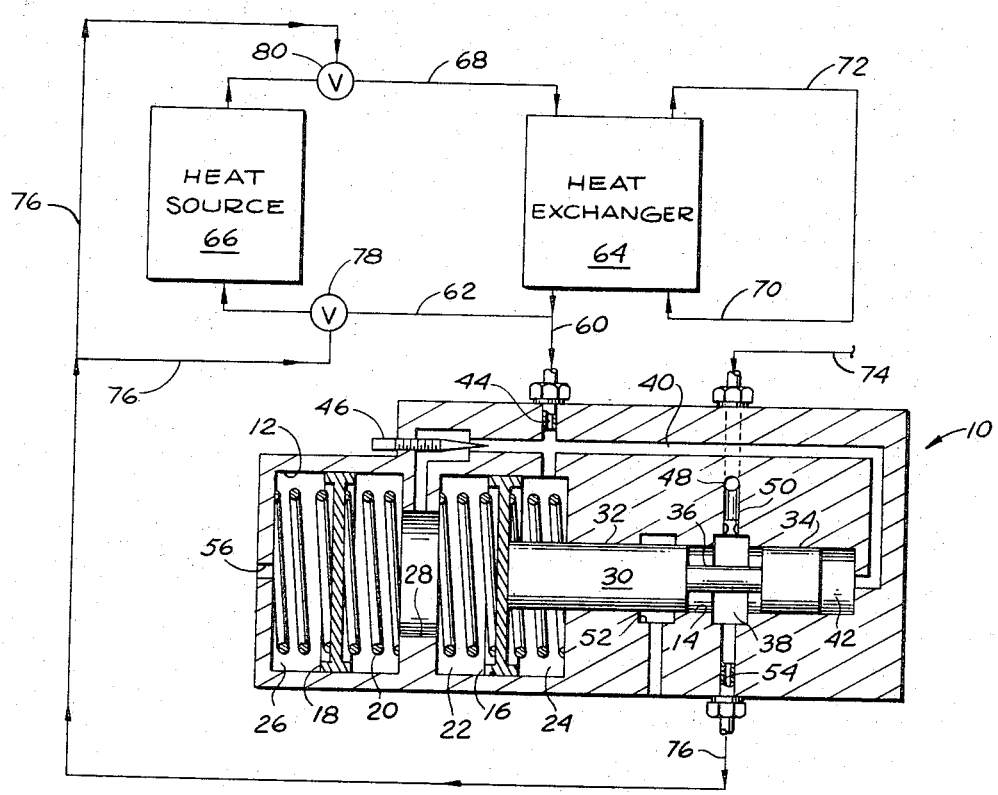
FIGURE 1 is a diagrammatic view of one form of hydraulic system employing one form of automatic controller, shown in section, according to my invention.

Referring to FIGURE 1, one form of my automatic controller 10 is shown for illustration purposes in a conventional steam generating system, hereinafter described in detail. It is contemplated that the automatic controller 10 may be employed in any fluid system where it is desirable to provide automatic detection and control of system parameters.

The automatic controller 10 of FIGURE 1 has interconnecting cylinders 12 and 14. The first cylinder 12 has a suitable piston means such as first or sensing piston 16 and second or buffer piston 18. Since incompressible fluids are generally used in the systems wherein the automatic controller of the present invention finds particular use, a capacitance is introduced into the system by the spring-loaded buffer piston 18. The sensing and buffer pistons 16 and 18 are double-acting and are maintained in a spaced apart, neutral position within the first cylinder 12 by a suitable spring means such as similar coil springs 20. In this neutral position, the sensing and buffer pistons 16 and 18 define several chambers within the first cylinder 12. These chambers are a first motor or balance chamber 22 which is defined in part by the obverse faces of pistons 16 and 18, a second motor chamber which is defined in part by the reverse face of piston 16, and a buffer chamber 26 which is defined in part by the reverse face of piston 18. A limit stop means such as radially inwardly extending projection 28 in the first motor chamber 22 serves to limit the movement of the double-acting pistons 16 and 18 from the neutral position as shown by FIGURE 1.

The second cylinder 14 in the automatic controller 10 is suitably formed to receive a valve means such as valve spool member 30. Valve spool member 30 has a first land portion 32 spaced from a second land portion 34 by a reduced portion 36 which defines an annular chamber 38 within the second cylinder. The first land portion 32 of the valve spool member 30 is suitably attached to the reverse face of sensing piston 16 so that movement of the sensing piston displaces the valve spool member.

A fluid passageway 40 in the automatic controller 10 places the first motor chamber 22 in fluid communication with both the second motor chamber 24 and a third motor chamber 42 whose one wall is defined by one face of the second land portion 34 of the valve spool member 30. Input signal pressure from a fluid system such as the conventional steam generating system diagrammatically shown by FIGURE 1 passes through input inlet 44 to the fluid passageway 40. An adjustable means such as needle valve 46 in fluid passageway 40 restricts the input pressure as it passes to the first motor chamber 22; however, the input flowrate to the second and third motor chambers 24 and 42, respectively, is unrestricted. The input flow to the third motor chamber 42 through fluid passageway 40 adds the surface area lost on the reverse face of the first piston 16 by the attachment of the first land portion 32 of the valve spool member 30 thereto.

A supply pressure inlet 48 places the annular chamber 38 in fluid communication with an external pressure source (not shown) such as a source of pneumatic or hydraulic pressure. It is also contemplated that the operating fluid such as that used in the conventional steam generating system can be used for a pressure supply to the supply pressure inlet 48. The supply pressure inlet 48 has a restricted portion or orifice 50 in the inlet 48 that checks the flowrate of fluid passing from the external pressure source into the annular chamber 38.

Figure 4:
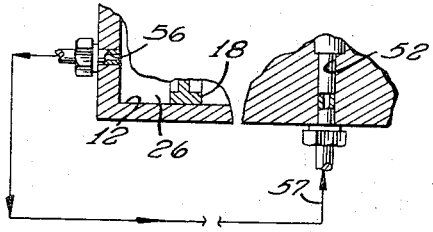
FIGURE 4 is another form of automatic controller, also shown in section and partly broken away, according to the invention.

In the embodiment shown by FIGURE 1, the second cylinder 14 has an exhaust port 52 that is substantially closed by the first land portion 32 of the valve spool member 30 when the first and second pistons 16 and 18 are in the neutral position. The buffer chamber 26 has an exhaust port 56 that can be open to the surrounding atmosphere or can be connected by a suitable means such as a conduit 57 as shown by FIGURE 4 to the exhaust port 52. This latter arrangement is desirable where the fluid that is introduced into the automatic controller of the present invention must be controlled because of economics, toxicity, or the like.

An output pressure signal port 54 opens into the annular chamber 38 of the second cylinder 14 and is normally uncovered by the valve spool member when the first and second pistons 16 and 18 are in the neutral position.

Operatively, the automatic controller of the invention may find use in a conventional steam generating system such as diagrammatically shown by FIGURE 1. Certain conventional devices normally associated with a steam generating system have been omitted in the drawing for clarity in describing the present invention in one operating environment.

The automatic controller 10 is connected by an input line 60 to line 62 of a primary loop which connects a heat exchanger 64 to a heat source 66. Line 68 completes the primary loop between the heat exchanger 64 and the heat source 66. It is contemplated that the heat source 66 can be connected by separate primary loops (not shown) to other heat exchangers in addition to heat exchanger 64. Inlet line 70 introduces feedwater into the heat exchanger 64 and outlet line 72 passes steam from the heat exchanger. Input line 60 is connected to the input inlet 44 of the automatic controller 10 and reflects the pressure in the primary loop. A pressure line 74 from an external source as described hereinbefore is connected to the supply pressure inlet 48 of the automatic controller 10.

A signal line 76 is connected between the output pressure signal port 54 of the automatic controller 10 and suitable control valve means, e.g., relief or isolation valves, such as valve 78 in line 62 and valve 80 in line 68.

A flat input pressure signal or ramp passes, under normal operating conditions, from the primary loop of the steam generating system through the input line 60 to the fluid passageway 40 of the automatic controller 10 and into the first chamber 22, second chamber 24, and third balancing chamber 42. Since at flat pressure signals a balancing force is produced in the first or balance chamber 22, the pressure in the balance chamber essentially follows the slow input pressure of the second and third motor chambers and little or no movement of the sensing piston 16 occurs from the neutral position as shown by FIGURE 1.

A malfunction in the steam generating system, such as the rupture of a tube in the heat exchanger 64, develops a steep input pressure signal which passes through the input line 60 to the automatic controller 10. Since the fluid passageway 40 is unrestricted to the second motor chamber 24 and the third motor chamber 42, the pressure in these chambers accurately reflects the steep pressure signal. However, the needle valve 46 restricts the passage of the sharp input pressure signal into the balance chamber 22 that sets up a pressure differential between balance chamber 22 and the second chamber 24. This pressure differential across sensing piston 16 causes the normally balanced piston to become unbalanced and to move to the left as viewed in FIGURE 1. The movement of the sensing piston 16 displaces both the attached valve spool member 30 and the buffer piston 18 since the fluid within the balance chamber 22 is generally incompressible. Any excess fluid within buffer chamber 26 passes through the exhaust port 56 as the buffer piston 18 is displaced.

The displacement of the valve spool member 30 by the sensing piston 16 moves the first land portion 32 to the left as viewed in FIGURE 1 and uncovers the exhaust port 52. The opening of exhaust port 52 sharply reduces the pressure within the annular chamber 38. The sharp reduction in pressure within the annular chamber 38 is reflected as an output pressure signal through pressure signal port 54 to signal line 76. The output pressure signal triggers or actuates valves 78 and 80 which can, inter alia, either isolate the failed loop from the remainder of the steam generating system or relieve a pressure buildup by venting. It is contemplated that the output pressure signal can also be used to actuate alarm bells, energize warning lights or the like.

Figure 2:
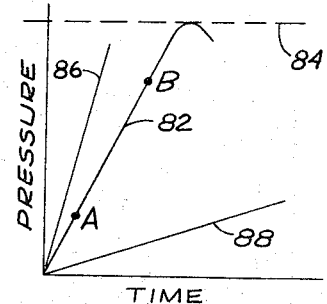
FIGURE 2 is a graphical representation of the operating characteristics as developed by the automatic controller of the invention.

On the pressure-time graph of FIGURE 2, curve 82 represents a pressure buildup within a system such as the conventional steam generating system as shown by FIGURE 1. The system rupture point is defined by the dashed line 84 in FIGURE 2. The automatic controller 10 of the present invention detects the input pressure rate of change signal from the system and generates a control signal at point A on curve 82 as described hereinbefore. Conventional pressure detectors operating on a pressure level trip point experience a time delay during the pressure buildup and release at a set pressure generally indicated by point B on curve 82. This delay subjects the entire system to an unwanted pressure buildup which approaches the system rupture point and introduces undesirable stresses on the system.

The slope of the pressure-time curve as shown by FIGURE 2 can be altered with the automatic controller 10 of the present invention by adjusting the needle valve 46. When the needle valve 46 is nearly closed, i.e. nearly seated, the automatic controller 10 responds, or is more sensitive, to pressure fluctuations as shown on curve 86. When the needle valve 46 is nearly open, the automatic controller 10 would respond to pressure fluctuations as shown on curve 88. Both curves 86 and 88 are shown relative to curve 82 and are shown as a general indication of the sensitivity of the automatic controllers described herein.

Figure 3:
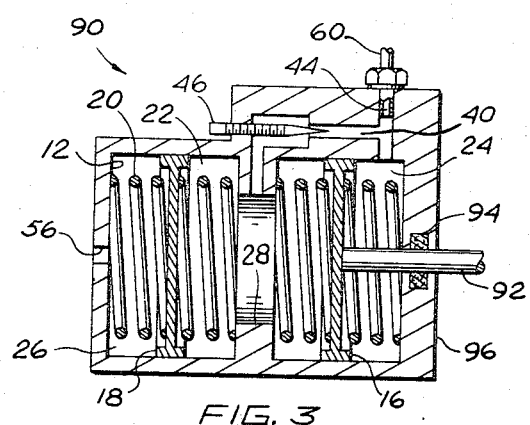
FIGURE 3 is another form of automatic controller, also shown in section, according to my invention.

FIGURE 3 shows one modification of the automatic controller of the present invention. The automatic controller 90 has like parts as described hereinbefore and as shown by FIGURE 1 and these like parts are represented by the same reference numbers in FIGURE 3. An actuating rod 92 is attached to the reverse face of the sensing piston 16 and extends through a suitable seal 94 in wall 96 of the automatic controller 90. Movement of the sensing piston 16 from the neutral position displaces the rod 92 and transmits an output signal to a calibrated dial, an indicator switch, an alarm bell, or the like (all not shown).

As will be evidenced from the foregoing description certain aspects of the invention are not limited to the particular details of construction as illustrated and it is contemplated that other modifications and applications will occur to those skilled in the art. It is, therefore, intended that the appended claims shall cover such modifications and applications that do not depart from the true spirit and scope of the invention.

What I claim as new and desire to secure by Letters Patent of the United States is:

1. An automatic controller comprising:
  (a) at least one cylinder, (b) first and second piston means reciprocable in said cylinder and having opposed obverse faces, (c) spring means normally balancing said first and second pistons in a spaced-apart neutral position, (d) a first motor chamber in said first cylinder cooperating with the obverse faces of said first and second pistons, (e) at least a second motor chamber in said cylinder cooperating with the reverse face of said first piston, (f) a buffer chamber in said cylinder cooperating with the reverse face of said second piston, (g) at least one passageway having an adjustable means placing said first and second motor chambers in fluid communication, (h) at least one input inlet to said passageway, (i) at least one port to said buffer chamber, and (j) signal means cooperating with said first piston so that a transient pressure surge to said input inlet which is greater than a predetermined value as preset by said adjustable means displaces said first piston to a first position away from said neutral position which actuates said signal means, said first motor chamber and said buffer chamber cooperating to restore said first piston to said neutral position.

2. An automatic controller comprising:
(a) first and second interconnecting cylinders,
(b) first and second piston means reciprocable in said first cylinder and having opposed obverse faces,
(c) spring means normally balancing said first and second pistons in a spaced-apart neutral position,
(d) an annular chamber in said second cylinder,
(e) a valve means slidable in said second cylinder,
(f) said valve means cooperating with said first piston,
(g) a first motor chamber in said first cylinder cooperating with the obverse faces of said first and second pistons,
(h) a second motor chamber in said first cylinder cooperating with the reverse face of said first piston,
(i) a buffer chamber in said first cylinder cooperating with the reverse face of said second piston,
(j) a third motor chamber in said second cylinder cooperating with said valve means,
(k) a first passageway having an adjustable means placing said first motor chamber in fluid communication with said second and third motor chambers,
(l) a first input inlet to said first passageway,
(m) a second passageway in fluid communication with said annular chamber,
(n) a second input inlet to said second passageway,
(o) an exhaust port cooperating with said annular chamber normally closed by said valve means in said neutral position,
(p) at least one port to said buffer chamber,
(q) a signal port cooperating with said annular chamber normally open in said neutral position, and
(r) a signal line in fluid communication with said signal port so that a transient pressure surge to said first input inlet which is greater than a predetermined value as preset by said adjustable means displaces said first piston and said valve means to a first position away from said neutral position which opens said exhaust port to said annular chamber, said first motor chamber and said buffer chamber cooperating to restore said first piston and said valve means to said neutral position.

3. The automatic controller of claim 2 in which said first input inlet is positioned between said adjustable means and said second and third motor chambers.

4. The automatic controller of claim 2 in which said first cylinder has a stop means within said first motor chamber between said spaced-apart first and second pistons.

5. The automatic controller of claim 2 in which said second passageway has a restricted means.

6. The automatic controller of claim 2 in which said port to said buffer chamber is in fluid communication with said exhaust port.

7. An automatic controller comprising:
(a) first and second interconnecting cylinders,
(b) first and second piston means reciprocable in said first cylinder and having opposed obverse faces,
(c) spring means normally balancing said first and second pistons in a spaced-apart neutral position,
(d) a valve means slidable in said second cylinder,
(e) first and second land portions on said valve means spaced apart by a reduced portion defining an annular chamber therebetween,
(f) said valve means cooperating with said first piston,
(g) a first motor chamber in said first cylinder cooperating with the obverse faces of said first and second pistons,
(h) a second motor chamber in said first cylinder cooperating with the reverse face of said first piston,
(i) a buffer chamber in said first cylinder cooperating with the reverse face of said second piston,
(j) a third motor chamber in said second cylinder cooperating with said second land portion of said valve means,
(k) a first passageway having an adjustable means placing said first motor chamber in fluid communication with said second and third motor chambers,
(l) a first input inlet to said first passageway between said adjustable means and said second and third motor chambers,
(m) a second passageway in fluid communication with said annular chamber,
(n) a second input inlet to said second passageway,
(o) a restricted means in said second passageway,
(p) an exhaust port cooperating with said annular chamber normally closed by said first land portion in said neutral position.
(q) at least one port to said buffer chamber,
(r) a signal port cooperating with said annular chamber normally open in said neutral position, and
(s) a signal line in fluid communication with said signal port so that a transient pressure surge to said first input inlet which is greater than a predetermined value as preset by said adjustable means momentarily displaces said first piston and said valve means to a first position away from said neutral position which opens said exhaust port to said annular chamber, said first motor chamber and said buffer chamber cooperating to restore said first piston and said valve means to said neutral position.

8. An automatic controller comprising:
(a) first and second interconnecting cylinders,
(b) first and second double-acting pistons reciprocable in said first cylinder and having opposed obverse faces,
(c) coil springs normally balancing said first and second pistons in a spaced-apart neutral position,
(d) a valve spool member slidable in said second cylinder,
(e) first and second land portions on said valve spool member spaced apart by a reduced portion defining an annular chamber therebetween,
(f) said valve spool member attached to said first piston,
(g) a first motor chamber in said first cylinder cooperating with the obverse faces of said first and second pistons,
(h) a second motor chamber in said first cylinder cooperating with the reverse face of said first piston,
(i) a buffer chamber in said first cylinder cooperating with the reverse face of said second piston,
(j) a third motor chamber in said second cylinder cooperating with said second land portion of said valve spool member,
(k) a first passageway having a restricted variable means placing said first motor chamber in fluid communication with said second and third motor chambers,
(l) a first input inlet to said first passageway between said variable means and said second and third motor chambers,
(m) a second passageway in fluid communication with said annular chamber,
(n) a second input inlet to said second passageway,
(o) a restricted orifice in said second passageway,
(p) an exhaust port cooperating with said annular chamber normally closed by said first land portion in said neutral position,
(q) at least one port to said buffer chamber,
(r) a signal port cooperating with said annular chamber normally open in said neutral position, and
(s) a signal line in fluid communication with said signal port so that a transient pressure surge to said first input inlet which is greater than a predetermined value as preset by said variable means momentarily displaces said first piston and said valve spool member to a first position away from said neutral position which opens said exhaust port to said annular chamber, said first motor chamber and said buffer chamber cooperating to restore said first piston and said valve spool member to said neutral position.

9. The automatic controller of claim 8 in which said port to said buffer chamber is in fluid communication with said exhaust port.

References Cited

UNITED STATES PATENTS 2,646,813  7/1953  Mueller _____ 251—63 X
3,238,966  3/1966  Howard et al. _____ 137—488

M. CARY NELSON, *Primary Examiner.*

A. ROSENTHAL, *Assistant Examiner.*